May 14, 1935. J. C. SUCHLAND 2,000,999
TRAILER
Filed July 30, 1931 3 Sheets-Sheet 2
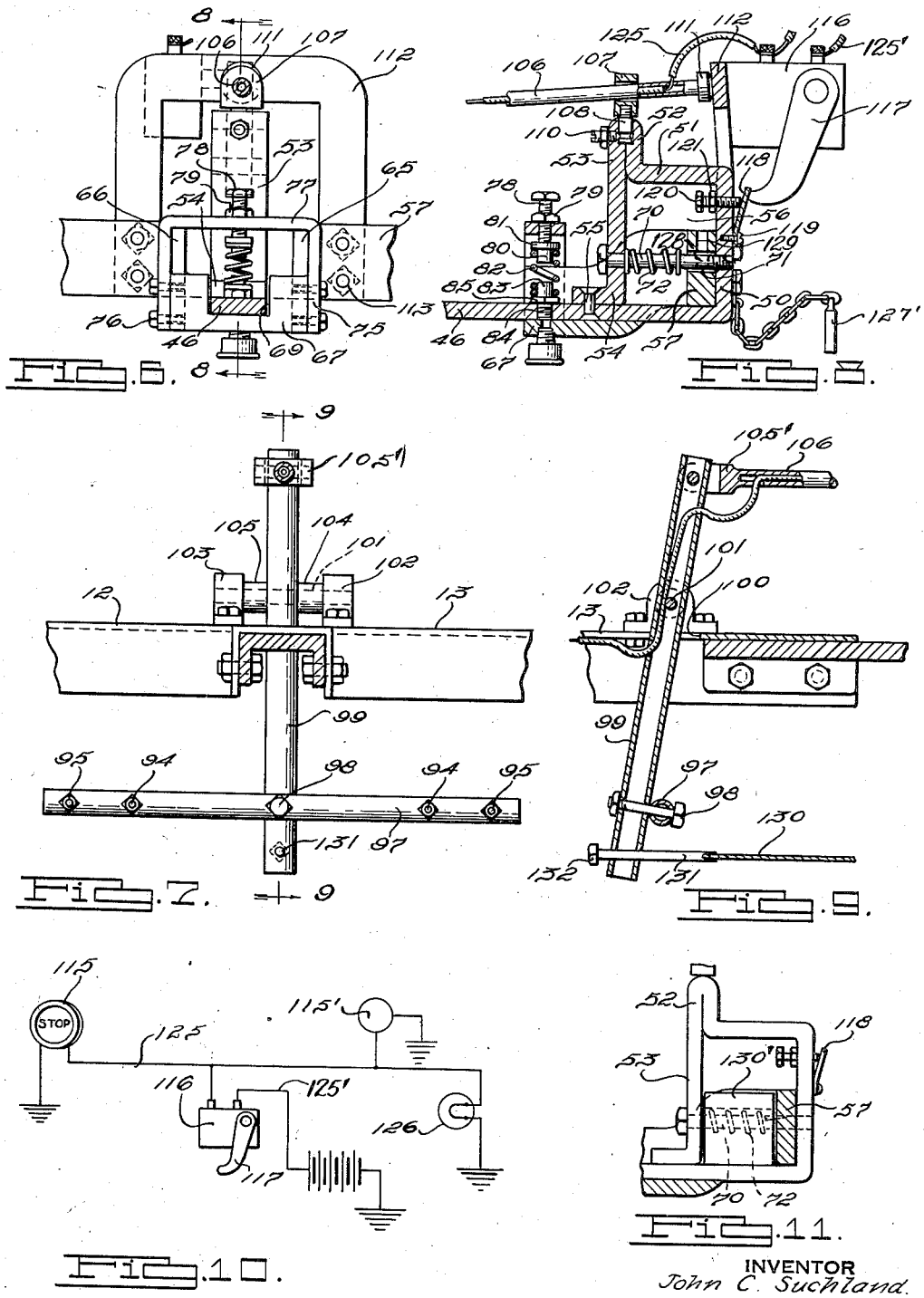
INVENTOR
John C. Suchland.

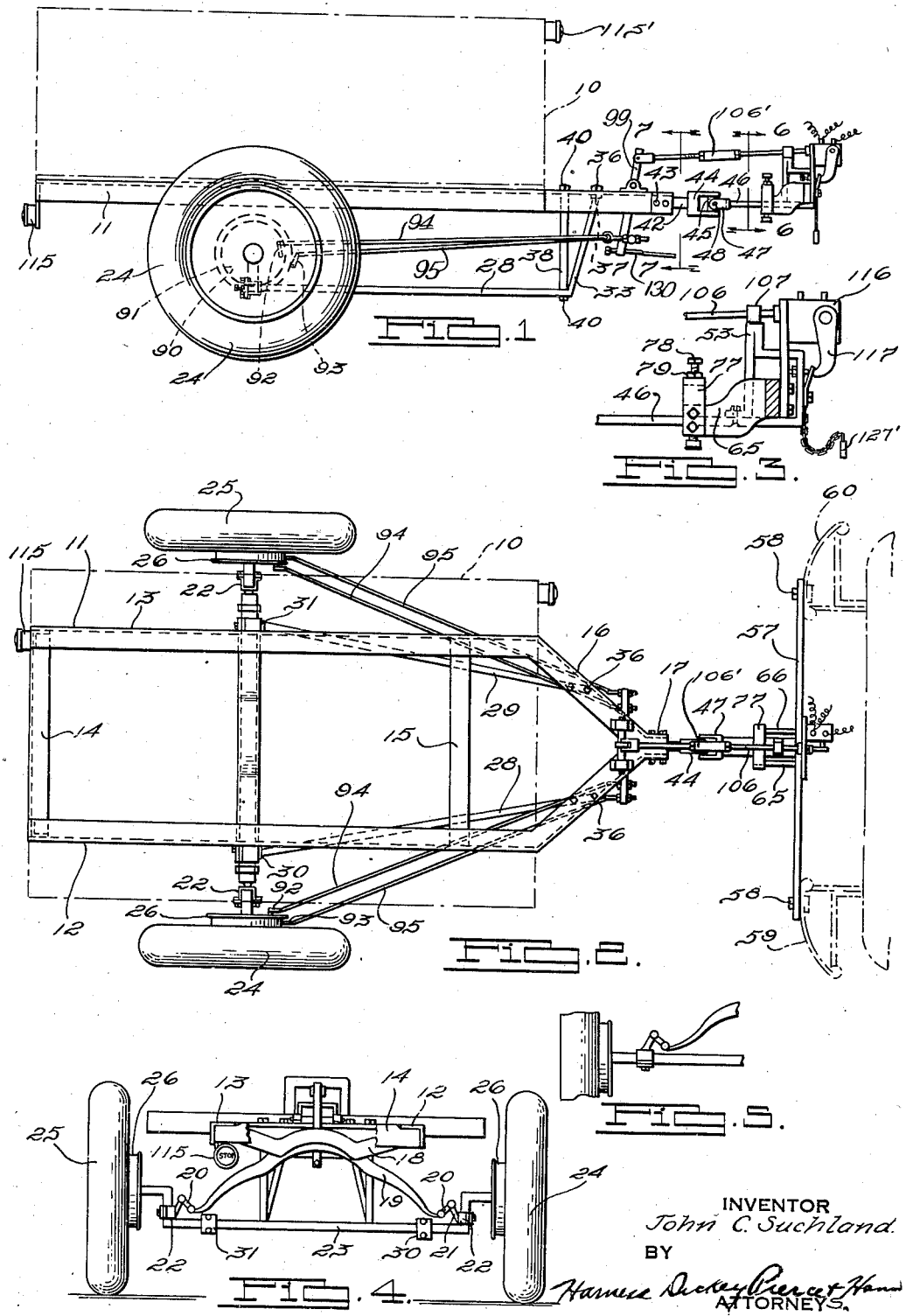

May 14, 1935.  J. C. SUCHLAND  2,000,999
TRAILER
Filed July 30, 1931     3 Sheets-Sheet 3

INVENTOR
John C. Suchland.
BY
Harness Dickey Pierce & Henn
ATTORNEYS

Patented May 14, 1935

2,000,999

UNITED STATES PATENT OFFICE 2,000,999

TRAILER

John C. Suchland, Lincoln Park, Mich.

Application July 30, 1931, Serial No. 553,920

12 Claims. (Cl. 188—112)

The invention relates generally to vehicles and it has particular relation to a trailer adapted to be connected to a vehicle such as an automobile, tractor or the like.

The principal objects of the invention are to provide a trailer for the above designated purpose, which will be maintained constantly in proper alignment with the vehicle to which it is connected and consequently not swerve from its proper position behind the motor vehicle; to provide a trailer having brakes, which is so connected to the vehicle that when the latter slows up or stops, the brakes on the trailer will immediately be applied in a very positive and efficient manner; to provide a trailer which is so constructed and connected to the vehicle, that it will not jar and jolt along the roadway, but to the contrary will run smoothly and uniformly in a manner similar to that in which the ordinary automobile will function when driven on the roadway; to provide a trailer having signal lights which are automatically operated when the vehicle to which it is connected, begins to slow up or stop, for the purpose of warning traffic of the presence of the trailer; to provide a trailer of the above designated character, which is so constructed and connected to the vehicle, that it will turn properly and in accordance with the turning of the latter; to provide a trailer which is so connected to the vehicle, that undesirable movement in an up and down and crosswise direction such as usually, characterize connections between trailers and motor vehicles, will practically be eliminated; and to provide a trailer assembly of the above designated character, which is of simple and inexpensive construction, highly efficient in operation, and extremely durable.

Figure 1 is a side elevational view of a trailer assembly constructed according to one form of the invention;

Fig. 2 is a plan view of the construction shown by Fig. 1, also particularly illustrating the manner in which the trailer can be connected to the bumper of an automobile;

Fig. 3 is a detailed view of the construction shown by Fig. 1, illustrating particularly the connection between the automobile and the trailer;

Fig. 4 is a rear elevational view of the construction shown by Fig. 1, with the body of the trailer removed for the purpose of clarity;

Fig. 5 is a detailed view illustrating the spring suspension between the chassis of the trailer and the axle thereof;

Fig. 6 is a cross-sectional view on a larger scale, taken substantially along line 6—6 of Fig. 1;

Fig. 7 is a cross-sectional view, taken substantially along the line 7—7 of Fig. 1, also illustrating the parts on a larger scale;

Fig. 8 is a cross-sectional view, taken substantially along line 8—8 of Fig. 6;

Fig. 9 is a cross-sectional view, taken substantially along line 9—9 of Fig. 7;

Fig. 10 is a diagrammatic illustration of an electrical circuit including signal lights associated with the trailer;

Fig. 11 is a detail view similar to that shown by Fig. 8, illustrating an arrangement particularly adapted for backing the trailer upon backing the motor vehicle to which it is connected.

Figure 12:
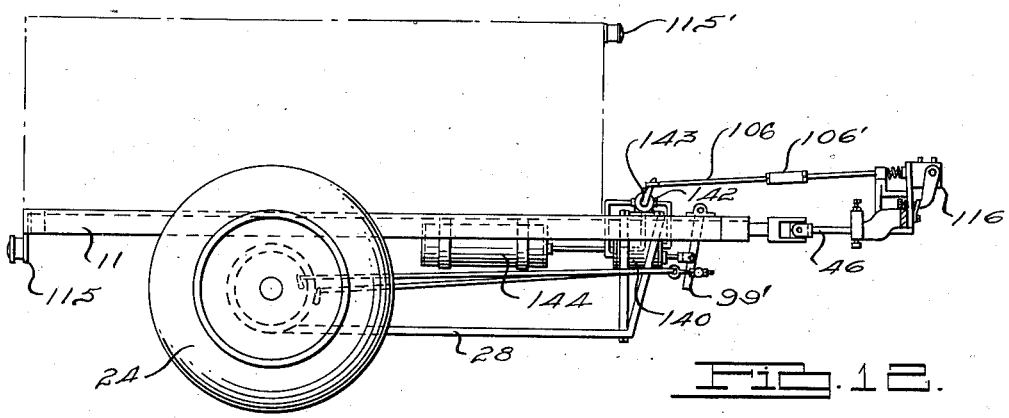
Fig. 12 is a view similar to Fig. 1, illustrating fluid operated brake mechanism on the trailer.

Referring to Figs. 1 and 2, the body of the trailer is indicated in broken lines at 10 and is supported on a chassis 11. The chassis comprises angle irons 12 and 13 connected at their rearward end by an angle iron 14 and adjacent their forward end by a metal strap 15. Forwardly of the strap 15 the angle irons 12 and 13 extend in converging relation thereby forming a V-shaped front indicated at 16. The converging portions of the angle irons are so formed as to provide a forwardly projecting portion 17, it being understood that the meeting edges of the horizontal legs of the angle irons are secured together and preferably by welding. The forwardly projecting portion 17 defines a socket having an open bottom and open front, but which is bounded at the top by the horizontal legs of the angle irons, and at the sides by the spaced vertical legs of the angle irons.

Intermediate their ends, the angle irons 12 and 13 are secured to a spring support 18 as best shown by Fig. 4, and this support in turn is associated with a transversely extending spring 19. Each end of the spring projects downwardly, and is pivotally connected to a link 20, which in turn is pivotally connected to a pin 21 secured to one end of an axle 23 by means of a bracket 22 clamped thereto. The axle 23 at opposite ends rotatably supports wheels 24 and 25, each of which is provided with a brake 26. Radius rods 28 and 29 secured to opposite ends of axle 23 as indicated at 30 and 31 in Fig. 4, project forwardly in slightly converging relation to points below the V-shaped front 16 of the chassis, and at their forward ends, the rods project upwardly as indicated at 33 in Fig. 1, and through the horizontal legs of the respective angle irons. Nuts 36 and 37 threaded on the upper ends of the radius rods and disposed on opposite sides of the horizontal legs thereof, firmly secure the rods to the chassis. Additional rods 38 extending between the radius rods and the angle irons 12 and 13, and located at the forward ends of the latter, are secured to such members by means of nuts 40, thereby providing a more rigid assembly.

As best shown by Fig. 1, a bar 42 projects into the socket previously mentioned as being formed in the projection 17 at the front end of the chassis, and is secured rigidly to such projection by means of bolts 43. The forward end of the bar 42 is provided with a bifurcated portion 44 and between the legs of the latter, a pin 45 is provided which is journaled in such legs and disposed in a vertical plane. A second bar 47 is provided with a bifurcated portion 46 straddling the pin 45 and which is connected to such pin by means of a second pin 48 projecting transversely therethrough. From this description it should be apparent that the bar 46 can be turned either in a horizontal plane or in a vertical plane and hence is connected in a sort of universal manner to bar 42.

Now as best shown by Fig. 8, the bar 46 at its forward end projects upwardly as indicated at 50 and this portion at its upper end is bent rearwardly as indicated at 51. The portion 51 terminates in an upwardly bent portion 52 and the latter portion at its upper end is bent downwardly as indicated at 53 and finally terminates in a step portion 54 rigidly secured by means of a rivet or the like 55 to the horizontal portion of the bar 46, rearwardly of the upwardly projecting portion 50. The several portions mentioned at the forward end of bar 46 define an approximately rectangular opening 56 at the forward end of the bar, and this space is adapted to receive a transversely extending bar 57 which as best shown by Fig. 2, is secured at opposite ends by means of bolts 58 to the right and left rear bumpers of a motor vehicle as indicated at 59 and 60.

At opposite sides of the bar 46, the bar 57 is provided with rearwardly projecting arms 65 and 66 which project slightly downwardly as indicated in Fig. 8, and are interconnected at their rearward ends by means of a transversely extending plate portion 67. The plate portion 67 intermediate of its ends is provided with a substantially rectangular recess 69 which receives the bar 46. From this description, it should be apparent that the bar 46 can move forwardly and rearwardly to the extent that the bar 57 can move in the opening 56 defined by the portions 50 and 53 of the bar 46. Also it should be understood that bar 46 during such movement will slide along in recess 69 in plate 67. In this connection it is desired to point out that the recess 69 is of such dimensions that slight lateral movement of bar 46 is permitted and this has been found particularly desirable in the assembly. Normally of course during movement of the motor vehicle at the front end of the trailer, the bar 57 will engage the rearward side of portion 50 of bar 46, and hence pull the trailer along behind it. In the event the motor vehicle has to slow up or come to a stop, it is apparent that bar 46 connected to the trailer, will move forwardly owing to the momentum of the trailer, and hence relatively speaking, bar 57 will move to the rear of space 56. For the purpose of resiliently cushioning such movement of the trailer with respect to the motor vehicle, a bolt 70 is provided which extends through the walls 50 and 53 at the forward end of the bar 46, and loosely through an opening 71 in bar 57. A spring 72 encircling the bolt 70 in the space 56, acts as a cushion and when bar 57 moves rearwardly relatively in the space 56, it will engage the spring 72 and the trailer will be cushioned and will not contact sharply against the bar 57 of the motor vehicle.

For preventing undesirable upward and downward movement of bar 46 when the trailer and motor vehicle are operating under various loads and roadway conditions, a U-shaped bracket 75 is provided which has its legs disposed at opposite sides of arms 65 and 66 projecting rearwardly from bar 57, and secured thereto by means of bolts 76. The bracket 75 is inverted and is provided with a base portion 77 disposed directly above the recess 69 in the plate portion 67 connecting arms 65 and 66; such base portion has a bolt 78 threaded downwardly therethrough and adjustably locked in position by means of a lock nut 79 adapted to engage the upper side of the base. Below the base, the bolt 78 has a cylindrical portion 80 at its lower end, and a shoulder 81 immediately above said portion. The cylindrical portion 80 is adapted to receive one end of a coil spring 82 and the shoulder 81 serves as an abutment for the end of the spring. The lower end of the spring encircles a cylindrical portion 83 formed on the upper end of a stud bolt 84 threaded in bar 46 but which terminates substantially flush with the lower surface of the bar. A lock nut 85 on stud bolt 84 located at the upper side of bar 46 serves to lock the bolt in position and also as an abutment for the lower end of spring 82. Normally this spring resiliently urges the bar 46 down into the slot 69 and prevents an upward and downward movement of the bar, but it is apparent that the tension of the spring may be adjusted merely by adjusting bolt 78 and hence the action of the spring changed to accommodate various road conditions, and various loads being transported by the trailer. For example, when the load on the trailer is heavy, the tension of the spring will be increased and conversely when it is light, the tension on the spring will be decreased. It will be apparent that the spring will not interfere with movement of the bar 46 with respect to bar 57.

Referring now to Figs. 1 and 2 again, each of the brakes 26 has an internal, expanding brake band 90 and an external, contracting brake band 91. Each of the internal brake bands is operated by means of an arm 92, while each of the external brake bands is operated by means of an arm 93. The arms 92 at each side of the trailer are connected to brake operating rods 94 while the arms 93 are connected to brake operating rods 95 and all of such rods extend forwardly in a general converging relation to points below the front end of the V-shaped portion 16 of the chassis. As best shown by Figs. 7 and 9, the rods 94 and 95 project through a transversely extending tubular bar 97 and preferably are adjustably secured to such bar to vary the operation of the brake bands. The bar 97 is connected intermediate its ends by means of a bolt 98 to a second tubular bar 99 projecting upwardly through an aperture 100 formed in the horizontal leg portions of the angle irons 12 and 13 at the junction of such angle irons at the forward end of the chassis. Above the angle irons, the bar 99 is pivotally connected to a pin 101 journaled in bearing brackets 102 and 103 secured by bolts respectively to the angle irons 12 and 13 and on the upper side thereof. Bushings 104 and 105 on the bolts 101 at opposite sides of the bar 99 prevent undesirable lateral movement thereof on the pin.

The upper end of the bar is pivotally connected to an arm 105', the body portion of which is tubular as indicated at 106 in Fig. 9, and such arm as best shown by Fig. 8, extends forwardly and above the front end of bar 46. This rod is adjustable in length by means of a threaded sleeve connection 106' and the front end of the arm loosely projects through a sleeve 107 which is rotatably mounted on a pin 108 having its lower portion located in a socket formed in the portions 52 and 53 at the front end of bar 46. A set screw 110 cooperates with a groove in the pin 108 inwardly of the socket, and maintains the pin in position. The extreme front end of arm 106 has a head 111 thereon which is adapted to abut a U-shaped bracket 112 having its legs secured, as shown by Fig. 6, by bolts 113 to the bar 57.

From this description it will be apparent that when the bar 57 on the motor vehicle moves rearwardly in space 56, or in other words the bar 46 on the trailer moves forwardly past the bar 57 on the motor vehicle, the arm 106 and particularly the head 111 thereon will engage the bracket 112 and consequently cause a relative movement of the bar 106 with respect to bar 46 on the trailer. Now as seen by Fig. 9, this results in a movement of the rod 99 about its pivot 101 on the chassis, which in turn will cause operation of the brakes. When the load on trailer is heavy, the rod 106 is increased in length by means of the connection 106' and when the load is light, the rod is shortened, causing a quicker operation of the brakes when the load is heavy and a delayed action of the brakes when the load is light. In this connection it is desired to call attention to the fact that preferably the brakes will be so adjusted that the internal expanding brakes will operate slightly ahead of the outer contracting brakes and this has been found to be particularly advantageous for properly braking the trailer.

For providing means for operating the brakes of the trailer, when the emergency brakes of the vehicle in front are applied, a rod 131 having a head 132 is slidably mounted in an opening in the lower end of bar 99 as shown by Fig. 9, and this rod is connected by a flexible connection 130 to means operating the emergency brakes of the motor vehicle in front of the trailer. Hence, the trailer brakes can be applied when the emergency brakes of the motor vehicle are applied and the trailer quickly stopped.

For indicating to traffic that the trailer is slowing up or about to stop, signal lights 115 and 115' are provided at the rear and front ends of the trailer, as best shown by Figs. 1 and 2, and these lights are adapted to be operated when the trailer moves forwardly relative to the vehicle pulling it. For effecting this result, a switch box 116 is mounted on the U-shaped bracket 112, as shown by Fig. 8, and is provided with a switch operating arm 117 pivotally associated with the box. The lower end of the arm normally contacts with a spring plate 118 secured to the portion 50 at the front end of bar 46, by means of a screw 119. The spring plate 118 is adapted to be bent into various positions by means of a bolt 120 threaded through the portion 50 of the bar 46, and which is locked into any adjusted position by means of a lock nut 121 on the bolt. In other words, by adjusting the bolt the position of the spring plate 118 may be varied and consequently its cooperation with the switch operating arm 117 either advanced or retarded. Wires indicated at 125 and 125' extending from the switch box 116 run through the tubular arm 106, as best shown by Figs. 8 and 9, and then downwardly through the tubular rod 99, and then rearwardly along one of the angle irons 12 and 13 below the horizontal leg thereof, and then to the signal lights 115 and 115'. It will be understood that the other terminals of the signal lights are suitably connected to grounds and the other terminal of the switch is connected to a battery in the motor vehicle. This electrical arrangement is shown by Fig. 10 and will be readily understood, and also includes a light 126 which is located in the motor vehicle for indicating to the driver when the signals are operating. From this description it will be apparent that when the trailer moves forwardly with respect to the motor vehicle, the spring plate 118 will move the switch arm 117 and cause the signal lights to be operated, thereby indicating to traffic either in the same direction or in an intersecting direction, that a trailer is connected to the motor vehicle and also that the trailer is slowing up or about to stop.

For the purpose of preventing operation of the brakes and signal lights when it is desired to move the trailer backwardly, a pin 127' may be provided which is adapted to cooperate with openings 128 and 129 in the front end of bolt 70 and the bar 57. This pin is connected to a chain in turn secured to the front end of the bar 46. When backing, the bar 57 engages the pin and accordingly relative movement of the trailer and vehicle in front thereof is prevented. This result may also be effected by means of a block indicated at 130' in Fig. 11, adapted to be disposed between the bar 57 and the portion 53 at the front end of arm 46 and such block will consequently prevent relative movement of the bar 57 with respect to bar 46 and cause positive backward movement of the trailer when the motor vehicle is moved backwardly. Preferably this block is of U-shape so that it will straddle the spring 72 and bolt 70.

Figure 13:
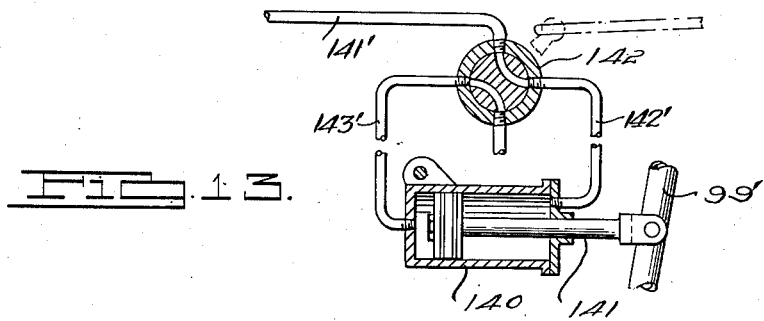
Fig. 13 is a cross-sectional view illustrating the fluid cylinder for operating the brakes.

According to Figs. 12 and 13, the brakes of the trailer are operated by fluid pressure and for effecting this result a fluid cylinder 140 is provided which has a piston, and a piston rod 141 connected to the bar 99' below the chassis. A four way valve 142 on the chassis has an arm 143 for operation of the valve, and this arm is connected to the rear end of arm 106. A fluid pressure storage tank 144 connected to the chassis serves to supply fluid under pressure to the valve and then to the cylinder. When the arm 106 is moved rearwardly upon forward movement of trailer with respect to the vehicle in front, the valve is so operated that fluid is supplied to the rear side of the piston which causes the brakes to be applied, and when the trailer again assumes its normal position, the valve is operated to supply fluid to the front side of the piston, thereby releasing the brakes. The tank 144 is connected to the valve 142 by a conduit 141', and other conduits 142' and 143' connect the valve to opposite ends of the cylinder 140.

Figure 14:
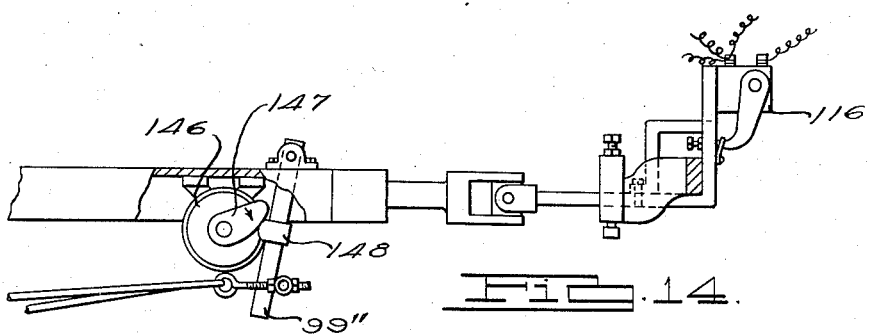
Fig. 14 is a fragmentary view illustrating a motor operated brake mechanism.
Figure 15:
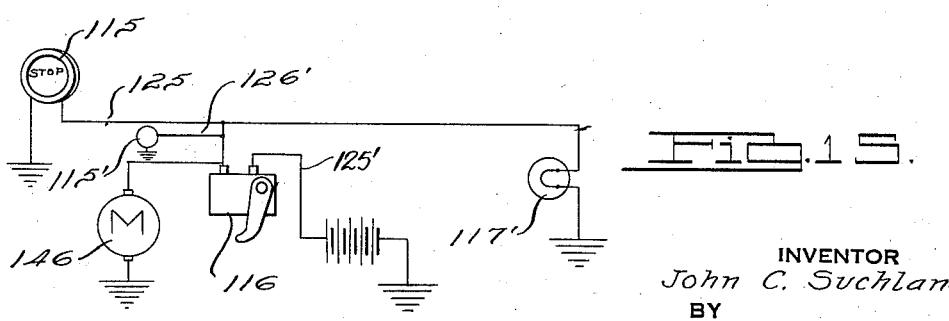
Fig. 15 is a diagrammatic illustration of the electric circuit for operating the signals and motor controlled brake.

According to Fig. 14, the brakes of the trailer are operated by a motor 146 mounted on the under side of the chassis, which has a cam arm 147 on its shaft adapted to engage a cam lug 148 on the bar 99'. The motor is operated by the switch 116 upon forward movement of the trailer with respect to the vehicle in front in the same manner that the signal lights are operated. When the switch is closed, the motor operates and the arm 147 on the motor shaft rapidly hits the cam lug 148 and maintains the arm 99' in brake operating position. The electrical circuit for the motor and signal lights is clearly illustrated by Fig. 15. In this arrangement, the rod 105' of course is not necessary.

From the above description it will be apparent that a trailer has been provided which is so connected to the motor vehicle that undesirable movement of the trailer will not occur and it will maintain a proper position at the rear of the motor vehicle. It is also apparent that means are provided for varying the connection between the trailer and the motor vehicle to permit transporting various loads in the trailer without varying the efficiency of operation of the trailer connection. Actual practice indicates that the trailer will operate smoothly and uniformly, will follow the motor vehicle very accurately in a straight path or in a curved path, and that the connection between the trailer and the motor vehicle normally will prevent any undesirable noise and also prevent practically all movement of the trailer in an undesirable manner. By this I mean that swerving of the trailer from one side to the other or in an upward and downward direction is efficiently prevented. It is also apparent from the previous description that an efficient means is provided for operating the brakes of the trailer and actual experience demonstrates that the brakes operate smoothly and uniformly and thus the trailer can be brought to a stop very quickly or that the brakes can be applied more slowly, depending upon the braking of the motor vehicle in front thereof. It will be also understood from the previous description that when the trailer is moved relatively forwardly with respect to the motor vehicle, the lights will be operated to indicate to traffic that the trailer is slowing up or stopping and hence prevent collisions which otherwise might occur. It should be understood that several trailers may be connected in tandem relation, each trailer serving to operate the brakes and lights on the trailer behind it. Also it is to be understood that the invention may be applied to steam and electric cars, or any cars, where one car pulls another.

Although only certain forms of the invention have been described and illustrated in detail, it will be apparent to those skilled in the art that various modifications may be made without departing from the scope of the appended claims.

I claim:

1. In combination with a vehicle, of a trailer having brakes, means so interconnecting the trailer and vehicle as to allow forward movement of the trailer with respect to the vehicle, said connection including a swivel connection, and means connected to the trailer rearwardly of said swivel and extending forwardly thereof for engaging the vehicle for operating the brakes.

2. In combination with a vehicle, of a trailer, and means interconnecting a part on the trailer with a part on the vehicle, said means comprising a member having an opening, secured to one of the parts, and a second member extending transversely through said opening and connected to the other part, said opening being larger than the second member so as to allow forward movement of the trailer with respect to the vehicle.

3. In combination with a vehicle, of a trailer, having brakes, means connecting the vehicle to the trailer, and electric means for operating the brakes, said means being operated automatically by momentum of the trailer when the vehicular speed is decreased.

4. In combination with a vehicle, of a trailer having brakes, means so interconnecting the trailer and vehicle as to allow forward movement of the trailer with respect to the vehicle, and electric means for operating the brakes upon such forward movement of the trailer.

5. In combination with a vehicle, a trailer having brakes, draw bar means connecting the trailer frame to the vehicle frame and being of such character as to allow relative forward movement of the trailer with respect to the vehicle, and movable brake operating means on the trailer, including a member extending forwardly at one side of the drawbar, for abutting a stationary part on the vehicle, said member during said relative forward movement of the trailer, abutting and being moved by engagement with the vehicle part to operate the brakes.

6. In combination with a vehicle, a trailer having brakes, draw bar means connecting the trailer frame to the vehicle frame and being of such character as to allow relative forward movement of the trailer with respect to the vehicle, and movable brake operating means on the trailer, including a member extending forwardly at one side of the draw bar, for abutting a stationary part on the vehicle, said member during said relative forward movement of the trailer, abutting and being moved by engagement with the vehicle parts to operate the brakes, and being adjustable in length to provide for adjustment.

7. In combination, a trailer frame, a vehicle frame, draw bar means connecting the frame to permit forward movement of the trailer with respect to the vehicle, brakes on the trailer, a brake operating member movably mounted on the trailer frame independently of the draw bar connection, and extending forwardly at one side of the draw bar for engagement with the vehicle frame, so that upon said relative movement occurring, the member is moved to operate the trailer brakes.

8. In combination, a trailer frame, a vehicle frame, draw bar means connecting the frame to permit forward movement of the trailer with respect to the vehicle, brakes on the trailer, a brake operating member movably mounted on the trailer frame independently of the draw bar connection, and extending forwardly at one side of the draw bar for engagement with the vehicle frame, so that upon said relative movement occurring, the member is moved to operate the trailer brakes, said member being mounted on the trailer frame to the rear of the draw bar connection, and engaging the vehicle frame at the front of the draw bar and at one side thereof.

9. In combination with a vehicle, a trailer having brakes, draw bar means connecting the trailer frame to the vehicle frame and being of such character as to allow relative forward movement of the trailer with respect to the vehicle, and movable brake operating means on the trailer, including a member extending forwardly at one side of the draw bar, for abutting a stationary part on the vehicle, said member during said relative forward movement of the trailer, abutting and being moved by engagement with the vehicle parts to operate the brakes, said draw bar connection including a pivotal connection for permitting horizontal swinging movement thereof, and a spring pressed connection for permitting limited vertical movement thereof.

10. The combination with a vehicle, of a trailer having brakes, draw bar means connecting the trailer and vehicle for permitting forward movement of the trailer relative to the vehicle, a member pivoted on the trailer frame independently of the draw bar connection, for operating the brakes, said member extending forwardly along a side of the draw bar and into proximity to the vehicle frame for abutting engagement therewith, and a guide for such member to slide in.

11. In combination with a vehicle, of a trailer having brakes, draw bar means connecting the trailer and vehicle for permitting forward movement of the trailer relative to the vehicle, a member pivoted on the trailer frame independently of the draw bar connection, for operating the brakes, said member extending forwardly along a side of the draw bar and into proximity to the vehicle frame for abutting engagement therewith, and a guide for such member to slide in, said draw bar means permitting vertical and horizontal relative movement of the trailer and vehicle.

12. The combination with a vehicle frame, of a trailer frame, a draw bar member pivoted to the trailer frame for horizontal swinging movement and terminating at its forward end in a bracket portion having a longitudinally recessed portion, a transversely extending bar connected to the vehicle and passing through said recess and being of such dimensions as to permit relative forward movement of the trailer with respect to the vehicle, said bar and member having plate portions for permitting sliding movement one over the other, means resiliently holding the plate portions together but permitting limited vertical separation thereof to permit limited vertical movement of the trailer with respect to the vehicle, brakes on the trailer, a member pivoted on the trailer frame for operating the brakes and extending forwardly along the draw bar member, means on the forward end of said draw bar for slidably guiding said brake operating member, and means on the vehicle frame for engaging the forward end of the brake operating member so that during forward relative movement of the trailer and vehicle, the brake operating member is pushed rearwardly with respect to the trailer for the purpose of operating the brakes.

JOHN C. SUCHLAND.